United States Patent
Krech

(10) Patent No.: US 8,650,062 B2
(45) Date of Patent: Feb. 11, 2014

(54) AUTOMATED REPLENISHMENT USING AN ECONOMIC PROFIT QUANTITY

(75) Inventor: John E. Krech, Eagan, MN (US)

(73) Assignee: Ephiphony, Inc., Eagan, MN (US)

( * ) Notice: Subject to any disclaimer, the term of this patent is extended or adjusted under 35 U.S.C. 154(b) by 371 days.

(21) Appl. No.: 12/075,524

(22) Filed: Mar. 12, 2008

(65) Prior Publication Data

US 2009/0187468 A1 Jul. 23, 2009

Related U.S. Application Data

(60) Provisional application No. 61/011,611, filed on Jan. 18, 2008.

(51) Int. Cl.
*G06Q 10/00* (2012.01)

(52) U.S. Cl.
USPC .......................................... 705/7.26; 705/10

(58) Field of Classification Search
None
See application file for complete search history.

(56) References Cited

U.S. PATENT DOCUMENTS

| | | | | |
|---|---|---|---|---|
| 5,608,621 | A * | 3/1997 | Caveney et al. | 705/7.25 |
| 5,946,662 | A | 8/1999 | Ettl et al. | |
| 6,341,269 | B1 | 1/2002 | Dulaney et al. | |
| 6,671,673 | B1 * | 12/2003 | Baseman et al. | 705/7.26 |
| 7,444,307 | B2 * | 10/2008 | Heires et al. | 705/400 |
| 7,881,986 | B1 * | 2/2011 | Pape et al. | 705/28 |
| 2001/0047293 | A1 * | 11/2001 | Waller et al. | 705/10 |
| 2002/0035537 | A1 * | 3/2002 | Waller et al. | 705/37 |
| 2002/0143665 | A1 * | 10/2002 | Santos et al. | 705/28 |
| 2002/0152148 | A1 * | 10/2002 | Ebert | 705/35 |
| 2004/0230475 | A1 | 11/2004 | Dogan et al. | |
| 2005/0240497 | A1 | 10/2005 | Heath | |
| 2006/0009988 | A1 | 1/2006 | McCormick | |
| 2006/0085299 | A1 | 4/2006 | Goll et al. | |
| 2007/0255605 | A1 * | 11/2007 | Meade | 705/7 |
| 2008/0027841 | A1 * | 1/2008 | Eder | 705/35 |

OTHER PUBLICATIONS http://college.cengage.com/accounting/resources/instructors/air/winter_2006/AIRCVPPaper_1_Kenett.html.*
T.E. Vollman, W.L. Berry, D.C. Whybark, and F.R. Jacobs Manufacturing Planning and Control Systems for Supply Chain Management McGraw-Hill 5th ed. 2004 598 pp. 117-147.
G. Hadley and T.M. Whitin Analysis of Inventory Systems Prentice-Hall 1963 452 pp. 82-156.
J.M. Stem and J.S. Shiely The EVA Challenge: Implementing Value Added Change in an Organization Wiley 2001 250 pp. 15-26.
R.B. Fetter and W.C. Dalleck Decision Models for Inventory Management R.D. Irwin 1961 128 pp. 27-108.
G.B. Stewart, III The Quest for Value: A Guide for Senior Managers HarperCollins 27th ed. 1991 800 pp. 2-5, 68-178, and 431-473.

(Continued)

*Primary Examiner* — Ryan Zeender
*Assistant Examiner* — Dana Amsdell
(74) *Attorney, Agent, or Firm* — Beck + Tysver, PLLC

(57) ABSTRACT

Prior art methods base inventory management on maximizing cost. The present invention shifts the focus to maximizing economic profit, taking income tax into account. Systems and methods are provided for digitally calculating an economic profit quantity that maximizes economic profit, defined as the excess of net operating income over capital charge, as well as the corresponding values of economic profit and recommended safety stock. Methods are provided for utilizing the economic profit quantity and associated recommended safety stock quantity for automatically placing orders, for choosing among suppliers, and for calculating space requirements.

23 Claims, 10 Drawing Sheets

(56) References Cited

OTHER PUBLICATIONS

E.A. Silver, D.F. Pyke, and R. Peterson Inventory Management and Production Planning and Scheduling Wiley 3rd ed. 1998 784 pp. 147-188, 300-301, and 198-223.

R.E. Markland, S.K. Vickery, and R.A. Davis Operations Management: Concepts in Manufacturing and Services West 1995 pp. 427-467.

W.H. Press, S.A. Teukolsky, W.T. Vettering, and B.P. Flannery Numerical Recipes in C Cambridge 2nd ed. 1992 pp. 347-455.

D. Erlenkotter Ford Whitman Harris and the Economic Quantity Model Operations Research vol. 38 pp. 937-947, 1990.

R.H. Wilson A Scientific Routine for Stock Control Harvard Business Review vol. 13 pp. 116-128, 1934.

F.W. Harris How many parts to make at once Operations Research 38 947 950 1990 Reprint from "Factory, The Magazine of Management", vol. 10, No. 2, Feb. 1913, pp. 135-136.

D. Erlenkotter An early classic misplaced: Ford W. Harris's Economic Order Quantity Model of 1915 Management Science vol. 35 pp. 898-900, 1989.

J.M. Cargal The EOQ Inventory Formula http://www.cargalmathbooks.com/The%20EOQ%20Formula.pdf Mar. 11, 2008 pp. 1-8.

J.M. Cargal Economic Order Quantity http://en.wikipedia.org/wiki/Economic_order_quantity Mar. 11, 2008.

D. Harper Understanding Economic Value Added http://www.investopedia.com/university/EVA 2005 Mar. 11, 2008 1-26.

SAP SAP Advanced Planning and Optimization 4.0 http://www.sap.com/solutions/business-suite/scm/pdf/BWP_APO40.pdf 2003 Mar. 11, 2008 1-19.

LogicTools Supply Chain and Inventory Optimization: Supply Chain Analyst http://www.logic-tools.com/products/supply_chain_analyst.html.

LogicTools Supply Chain and Inventory Optimization: Supply Chain Analyst: Inventory Analyst http://www.logic-tools.com/products/inventory_analyst.html LogicTools Supply Chain and Inventory Optimization: Supply Chain Analyst: Product Flow Analyst http://www.logic-tools.com/products/product_flow_optimizer.html.

LogicTools Supply Chain and Inventory Optimization: Supply Chain Analyst: Supply Planner http://www.logic-tools.com/products/supply_planner.html.

* cited by examiner

AUTOMATED REPLENISHMENT USING AN ECONOMIC PROFIT QUANTITY

CROSS-REFERENCE TO RELATED APPLICATION

This application claims the benefit of priority of, and incorporates by reference in its entirety, the U.S. provisional patent application entitled "Methods and Systems for Managing Economic Profit" filed Jan. 18, 2008, U.S. Ser. No. 61/011,611, having inventor John E. Krech.

FIELD OF THE INVENTION

The present invention relates to automated replenishment of inventory levels. More particularly, it relates to a system for automatically replenishing inventory levels and safety stock based an economic profit quantity that maximizes the excess of net operating income over capital charge.

BACKGROUND OF THE INVENTION

Prior art solutions to inventory management have focused on total cost and customer service. For example, Goll et al. (U.S. Pat. App. No. 2006/0085299 A1) provide a method and system to manage inventory based on order quantity and safety stock quantity such that total cost is minimized, while maintaining a desired customer service level. Ettl et al. (U.S. Pat. No. 5,946,662) provide a method to manage inventory levels for products in a complex supply chain network based on total inventory cost and customer fill rates. Koray et al. (U.S. Pat. App. No. 2004/0230475) provide a system to optimize inventory targets for nodes of a supply chain to satisfy a target customer service level.

Many formulas and algorithms have been created to minimize total cost. Fundamental to these methods is the Economic Order Quantity (EOQ), or Lot Size, Model. Still in use today, the model was originally developed by F. W. Harris in 1913. For the history of the EOQ Model, see D. Erlenkotter, "Ford Whitman Harris and the Economic Order Quantity Model", 38 *Operations Research*, 937-946 (1990). The formulation and operation of the model are explained by E. A. Silver, D. F. Pyke, and R. Peterson, *Inventory Management and Production Planning and Scheduling*, Wiley (3rd ed. 1998), 784 pp., pages 149-155.

We will summarize the EOQ Model for comparison with the present invention. For convenience in the discussion that follows, time will be expressed in years (yr). Currency will be expressed in dollars ($). Quantity will be expressed in units; in some contexts, fractional units make sense (e.g., bushels of wheat), but in others they do not (e.g., number of laptop computers). Unless otherwise specified in context, discussion of the present invention pertains to either situation.

The order quantity, or run size, Q (in units) represents a quantity of a particular item ordered from a supplier or facility, such as a distribution center or a manufacturer. Suppliers may be external vendors, manufacturers, distributors, warehouses, or any other entity or facility capable of supplying goods. The EOQ Model recommends ordering the quantity $Q_o$ that minimizes the total variable cost required to order and hold inventory. Determination of $Q_o$ involves the following four basic variables:

D: the demand (in units/yr). D is the annual unit demand forecast, which represents the need for a particular product or component. The demand could come from any number of sources, for example, customer orders, forecasts, interplant requirements, or requests from a branch warehouse for service parts or raw materials for manufacturing. Customers may be individuals, middlemen, or facilities acting like a customer in a supply chain (e.g. a manufacturer, distributor, warehouse, and the like). At the finished goods level, "demand data" are usually different from "sales data" because demand does not necessarily result in sales; for example, if there is no stock, there will be no sale.

$C_o$: the ordering cost (in $). $C_o$ is the fixed portion of the cost for placing and setting up a single order, and is therefore independent of Q. It includes those costs that increase as the number of orders placed increases. It includes costs related to the clerical work of preparing, releasing, following, and receiving orders; that portion of the physical handling of goods which is not dependent on quantity; inspection; and setup costs, as applicable. In today's environment of increasing fuel costs, $C_o$ also includes transportation costs.

$C_m$: the unit cost (in $). $C_m$ is the cost to buy an item of inventory (in the case of a retailer) or the cost of a component or a unit amount of raw material (in the case of a manufacturer), plus the marginal costs of value-added processing.

$r_h$: the holding cost ratio (in $yr^{-1}$). $r_h$ is the cost of holding one dollar of inventory for one year, and is usually expressed as a percentage of $C_m$ per year. $r_h$ includes storage, obsolescence, shrinkage, property insurance coverage, property taxes, and cost of capital. A commonly assumed value is 0.225/yr.

The total variable cost of ordering and holding inventory (in $/yr) is given by $$\hat{C} = \hat{C}_o + \hat{C}_h \quad (1)$$

where the total ordering cost is $$\hat{C}_o = C_o D/Q. \quad (2)$$

and the total holding cost is $$\hat{C}_h = \bar{i}\, C_m r_h, \quad (3)$$

where $\bar{i}$ is the average inventory; $\bar{i}$ will be discussed below.

The customer service level λ (dimensionless) is the ratio of the number of orders completed on time to the number of orders placed. For example, λ=0.97 means that 97% of orders can be filled immediately from available stock. The safety stock quantity Z (in units) is inventory in excess of forecast demand that is kept on hand to avoid stockouts and to maintain a high value of λ.

Two variations of the formula for $\hat{C}_h$, and correspondingly two variations in the calculation of EOQ, will be described below, the two variations differing as to whether safety stock is taken into account. If safety stock is not considered, determination of a closed-form expression for the economic order quantity $Q_o$ is possible. In this case, $$\bar{i} = Q/2 \quad (4)$$

so the total holding cost (in $/yr) is $$\hat{C}_h = C_m r_h Q/2. \quad (5)$$

Substituting equations (2) and (5) into (1), differentiating with respect to Q, setting the result equal to zero, and solving for Q yields the EOQ for the case where safety stock is not considered, $$Q_o = \left(\frac{2 C_o D}{C_m r_h}\right)^{1/2}. \quad (6)$$

FIG. 1 illustrates a specific example of the EOQ Model, for subsequent comparison with the approach of the present invention. In this example, the parameters are D=1200 unit/yr, $C_m$=$50, $C_o$=$100, and $r_h$=0.23/yr. The vertical axis 100 in the figure is cost. The horizontal axis 110 is order quantity Q. The dependence of the total annual variable cost of ordering and holding inventory $\hat{C}_o$ upon Q is shown in the figure with a dotted line 120. The shape of this curve reflects the fact that the number of orders within a year decreases as Q increases. The dependence of total annual holding cost $\hat{C}_h$ upon Q is shown with a dashed line 130. $\hat{C}_h$ increases linearly as Q increases. The sum of these two curves $\hat{C}$, the total cost, is shown with a solid line 140. The minimum 150 of the $\hat{C}_h$ curve 130 occurs at the order quantity Q=$Q_o$ indicated by reference number 160, which corresponds to the minimum total cost $\hat{C}_h$ indicated by reference number 170. In this particular example in which safety stock has been omitted from the calculation, the value of $Q_o$ is 144 units, as expected from equation (6).

A more realistic formulation of EOQ incorporates safety stock quantity Z and variability in lead time τ. τ (in yr) is the time interval between when an order is placed from a supplier and when the ordered goods are received. In this case, determination of an explicit formula for $Q_o$ analogous to equation (6) is not possible. $Q_o$ can, however, be determined by numerical solution.

A widely-used formula for safety stock quantity (Silver et al., p. 244) is $$Z = k\sigma \qquad (7)$$

where k is called the safety factor and σ is the standard deviation of the combined variability of demand during the forecast replenishment lead time and the variability of demand due to deviation in the lead time from the forecast lead time:

$$\sigma = \sqrt{\overline{\tau}\sigma_D^2 + (\overline{D}\sigma_\tau)^2} \qquad (8)$$

where $\overline{D}$ and $\sigma_D$ (in units) are, respectively, the mean and standard deviation of demand during the replenishment lead time, each multiplied by some characteristic time scale $\tau_0$. $\overline{\tau}$ and $\sigma_\tau$ are the mean and standard deviation of the lead time, each nondimensionalized by the time scale $\tau_0$. Equation (8) is discussed by T. E. Vollmann et al., *Manufacturing Planning and Control Systems for Supply Chain Management*, (McGraw-Hill, 5th ed. 2005), 712 pp., pages 133-135.

Additional safety stock should be carried if the actual replenishment quantity can vary from what was ordered. In this case, the following equation is used in lieu of (8):

$$\sigma = \sqrt{\overline{\tau}\sigma_D^2 + (\overline{D}\sigma_\tau)^2 + \sigma_Q^2}, \qquad (9)$$

where $\sigma_Q$ is the standard deviation of the replenishment quantity (in units) over the interval of time $\tau_0$.

Higher values of the safety factor k correspond to higher customer service levels (λ). Software tools are commercially available to determine k. Inventory planning tools are available in the SAP APO, for example, allowing safety factor k to be determined based on a service level over the lead time. Some packages, including MathCAD and Microsoft, facilitate empirical calculation of a formulation of k based on statistics the observed service level over lead time within the particular company engaged in the inventory management process.

Silver et al. (p. 736) provide the following formula for k:

$$k = \frac{a_0 + a_1 x + a_2 x^2 + a_3 x^3}{b_0 + b_1 x + b_2 x^2 + b_3 x^3 + b_4 x^4} \qquad (10)$$

where $x = \sqrt{\ln(25/\delta^2(k))}$ and $$\delta(k) = (1-\lambda)Q/\sigma. \qquad (11)$$

Note that equation (11) implies that Q depends σ.
The coefficients in equation (8) are

| | | | |
|---|---|---|---|
| $a_0$ | −5.3925569 | $b_0$ | 1 |
| $a_1$ | 5.6211054 | $b_1$ | −7.2496485 × 10⁻¹ |
| $a_2$ | −3.8836830 | $b_2$ | 5.07326622 × 10⁻¹ |
| $a_3$ | 1.0897299 | $b_3$ | 6.69136868 × 10⁻² |
| | | $b_4$ | −3.29129114 × 10⁻³. |

When safety stock is included in the model, the average inventory is $$\overline{i} = Q/2 + Z \qquad (12)$$

The total holding cost becomes $$\hat{C}_h = (Q/2 + Z)C_m r_h \qquad (13)$$

Substituting equations (2) and (13) into (1) gives:

$$\hat{C} = C_o D/Q + (Q/2 + Z)C_m r_h \qquad (14)$$

Analogously to the previous case in which storage stock was ignored, differentiating (1) with respect to Q, and setting the result equal to zero yields an equation for the economic order quantity $Q_o$. Although this equation cannot be solved in closed-form, a value of $Q_o$ can be determined for any given combination of parameters using standard numerical equation-solving techniques well known to persons of ordinary skill in the art, such as those found in W. H. Press, B. P. Flannery, S. A. Teukolsky, W. T. Vetterling, *Numerical Recipes in C,* 1992, 994 pp. Alternatively, well known minimization techniques can be applied directly to find the value of Q that minimizes $\hat{C}$ in (14); several such techniques are also provided by Press et al.

One of ordinary skill in the art will also recognize that software packages used to determine safety stock quantity based on lead time are known, such as SAP Advanced Planner and Optimization, available from SAP AG (Walldorf, Germany). Furthermore, software packages used to optimize inventory levels, optimize supply chain design, and to optimize supply chain plans relative cost and time are known, such as INVENTORY ANALYST available from LogicTools, Inc., which performs multi-echelon inventory optimization. INVENTORY ANALYST is part of the integrated tool SUPPLY CHAIN ANALYST, which also includes tools for distribution-focused analysis, seasonal build, sales and operations, demand planning, product flow optimization, and supply planning.

FIG. 2 illustrates the case just described in which total cost $\hat{C}$ incorporates the effect of safety stock, but is otherwise analogous to FIG. 1. The values of the parameters (D=1200 unit/yr, $C_m$=$50, $C_o$=$100, and $r_h$=0.23/yr) are the same as in the previous example. Additional parameters used in the calculation include: λ=0.97, $\overline{\tau}$=28 days, $\sigma_\tau$=5 days, $\overline{D}$=23 units/wk, and $\sigma_D$=10 units/wk. (Note that all these times must be first converted to years for the equations above to be used directly.) The vertical axis 200, the horizontal axis 210, the $\hat{C}_o$ curve 220, the $\hat{C}_h$ curve 230, and the $\hat{C}$ curve 240 should be interpreted in the same way as their counterparts in FIG. 1. However, here the $\hat{C}_h$ curve 230 includes the cost of safety stock, the contribution of which is shown in a separate curve 280. As in FIG. 1, the minimum 250 of the $\hat{C}_h$ curve 230 occurs at the order quantity $Q=Q_o$ indicated by reference number 260, which corresponds to the minimum total cost, indicated by reference number 270. Inclusion of safety stock results in a recommended order quantity $Q_o$ having a value (rounded to the nearest whole number) of 162 units, an increase of 18 units from the case described previously in which safety stock was ignored.

SUMMARY OF THE INVENTION

It is not unusual for a retailer to carry thousands of different types of items for sale, commonly known as stock-keeping units, or SKUs. As a practical matter, the frequency of placing orders (often weekly, and sometimes even daily with certain perishable goods), the sheer number of SKUs, and the number of vendors supplying those SKUs, means that, in many companies, replenishment of such inventory must be done by computer using logic embodied in software or digital hardware.

Prior art logic focuses on total cost and, in some cases, attaining customer service level objectives. The inventor has realized that the prior art has ignored, particularly in the area of replenishment, the opportunity to incorporate into inventory management a broader concept of managing income and cash flow growth. Instead of logic that simply reduces cost, the replenishment scheme of the present invention maximizes economic profit, which is the amount earned above the cost of capital. Economic profit is the difference between the profits the enterprise derives from its operations and the capital charge incurred through the use of its credit line (G. B. Stewart, *The Quest for Value*, Collins (27th ed. 1991), 800 pp., pages 2-4). Economic profit properly accounts for all the complex trade-offs involved in creating value. (Stewart, pages 136-137.) Economic profit is often referred to as ECONOMIC VALUE ADDED or EVA (Stern Stewart & Co.) The use of economic profit as a main corporate financial metric is discussed by J. M. Stern, *The EVA Challenge: Implementing Value-Added Change in an Organization*, Wiley (2003), 250 pp.

Although economic profit has been used as a performance metric, it has not been employed in the day to day operating decisions of a business enterprise. In particular, economic profit has not been used in inventory optimization and management.

It should be noted that while there is prior art using the term "economic profit" in the replenishment context, to the best of our knowledge in each case either the author did not define the term specifically enough to enable a person of ordinary skill in the art to know what was meant by "economic profit", or the author used the term with a different meaning from that just described. For example, Dulaney et al. (U.S. Pat. No. 6,341,269) give a method that "optimizes inventory and merchandising shelf space utilization based upon cost and lost sales, with or without considering space constraints". Their method incorporates holding cost, including lost opportunity and safety stock, as well as a quantity they call "economic profit". However, economic profit is defined (col. 12 lines 43-50) as the margin made on the sale of an item, minus the total cost including holding costs and lost sales. This definition of economic profit is much narrower than that used herein, and, in particular, does not include income taxes. Waller et al. (U.S. Pat. App. No. 2001/0047293) provide several methods for optimizing inventory, one of which is to "maximize economic profit". Their definition of economic profit (paragraphs 233-243) is essentially the same as that of Dulaney et al. McCormick (U.S. Pat. App. No. 2006/0009988) mentions income tax, but only considers in his strategic objectives optimizing earnings before income tax, thus ignoring the effect of income tax itself upon the merits of a particular ordering strategy.

Key drivers of economic profit include operating income, income taxes, capital utilized, and the cost of capital. Economic profit combines income statement and balance sheet performance. Economic profit differs substantially from accounting profit. Economic profit represents the residual income that remains after the opportunity cost of all capital has been deducted, whereas accounting profit is calculated without imposing a charge for equity capital.

The prior art based upon the EOQ Model minimizes the total variable costs by minimizing operating costs and carrying costs using the methods described in the Background section. Because the prior art ignores the effect of income tax, it cannot compare operating efficiency (from the income statement) with efficient balance sheet management that keeps the number of capital assets (i.e., inventory) low. Economic profit is a better metric because it represents "the pool of profits available to provide a cash return to all financial providers of capital to the firm." (Stewart, p. 86) The prior art also lacks the direct impact of safety stock within the operating efficiency derivation.

By calculating economic profit, the approach of the present invention is also more meaningful than prior art approaches that calculate cost, because the optimal economic profit from purchasing inventory can be directly compared with the economic profit a company can make from other opportunities, such as investing their money elsewhere.

In one embodiment of the invention, a request in digital form is received for an estimation of an economic profit quantity (EPQ), the economic profit quantity being defined to maximize the difference between net operating income and capital charge. Net operating income depends functionally upon income tax rate, and capital charge depends upon the expected capital value of inventory. The expected capital value of inventory depends functionally upon the safety stock.

The request is received on a digital processing system. Throughout this document, the term digital processing system shall refer to a single computer, a plurality of computers, or any other hardware or software adapted to, alone or in combination, executing logical instructions electronically. The request will typically be accompanied by a plurality of parameters required to do the calculation. Alternatively, some or all of the parameters might be retrieved from digital storage for use in the calculation. These parameters include those already described in connection with the calculation of EOQ, as well as income tax rate, storage cost, and cost of capital.

The request itself might be received across a network, which might be a local area network (LAN), a wide area network (WAN) such as the Internet, or a personal area network (PAN) such as a network employing Bluetooth technology. Alternatively, the request might originate on the same computer that is performing the calculation of EPQ, possibly even from within the same software application that performs the EPQ calculation. In short, within the scope of the invention, the source of the request in digital form to perform the calculation could be any source, local or remote.

An economic profit quantity (EPQ) that maximizes the difference between net income and capital charge is calculated using logic on the digital processing system. A detailed breakdown of the quantities making up net income and capital charge are provided in the section below entitled Detailed Description of the Invention. The calculation is performed using logic implemented in software or digital hardware on the digital processing system. The logic uses one or more of the parameters in calculating the EPQ. The EPQ is returned in digital form in response to the request.

In some embodiments, the safety stock quantity is also estimated by the logic, and returned. In some embodiments, a value of the economic profit, which corresponds to the EPQ, is also estimated by the logic, and returned.

Other embodiments of the invention involve communicating a request in digital form for estimation of an economic profit quantity (EPQ), as defined herein, and receiving the EPQ in response to the request. Calculation of the EPQ produces an estimate because it is based upon forecasts, such as forecast demand. The request might be communicated across a network (e.g., a LAN, WAN, or PAN). It might be communicated from software running on the same computer as software that performs the estimation; in some embodiments, the same software application that communicates the request also performs the calculations. In response to communicating the request, a response is received that includes the estimated economic profit quantity. In such embodiments, it is immaterial what entity or system actually performs the EPQ calculation; what matters is that the request is sent and a response including the calculated EPQ is received. In some embodiments, logic is executed on an electronic digital computer or other digital processing device that automatically causes a quantity of an item equal to the EPQ, or some quantity based upon the EPQ (e.g., a quantity between 85% and 115% of EPQ), to be ordered from a supplier.

In addition to the value of the EPQ, a recommended safety stock quantity and an estimated value of economic profit might also be received. Some embodiments cause the recommended safety stock quantity to be automatically ordered, possibly in addition to the estimated EOQ. Automatically ordering any quantity based on the recommended safety stock quantity (e.g., one between 85% and 115% of the recommended safety stock quantity) is within the scope of the invention.

The request for estimation of EPQ will normally be accompanied by at least one parameter necessary to perform the calculation. In some embodiments, a parameter is obtained from digital storage for this purpose.

Different suppliers may have different limitations in how they fulfill orders from a customer. For example, lead times might differ. In other words, two different suppliers might require two different values of the same parameter to be used in their respective calculation of EPQ for the same type of item. Comparison of economic profit can be used to choose between them. In some embodiments of the invention, after such a comparison is done, a preferred supplier is chosen automatically by digital logic based upon a determination of which supplier will give the higher economic profit. Logic in a digital processing system can be implemented according to techniques well known in the art to automatically place an order for the items from that supplier having the more favorable EPQ for the item type.

Ordering at the EPQ and maintaining the associated recommended safety stock quantity for a given type of goods (e.g., a particular SKU) will affect storage requirements. Order quantity and safety stock quantity can be estimated for each of a plurality of types of goods, and based upon those individual EPQs, logic on a digital processing system can be used to compute physical storage requirements for all of them. Space can be allocated in an existing facility, or new facilities can be built to contain the goods or materials based on the physical storage requirements estimated by the methods of the present invention.

Some embodiments of the invention include an apparatus used to do the calculation of EPQ. The apparatus comprises a digital processing system, and logic in the digital processing system implemented in software or digital hardware adapted to computing EPQ as defined herein. In some embodiments, the apparatus further includes digital storage containing a plurality of parameters adapted to being used in the calculation of EPQ, a digital network adapted to communication between the digital processing system and the digital storage, and logic within the digital processing system adapted to obtaining the plurality of parameters from the digital storage system through the digital network, and using them in estimation of the EPQ.

Some embodiments of the invention include an iterative method for calculating the economic profit quantity on a digital processing system. Many such techniques for maximizing a function are well known in the art. In this case, a maximization technique is applied to maximizing the economic profit, which is a function of the safety stock, which, in turn, is a function of the order quantity. The iterative technique can be used to find the EPQ, which is the value of order quantity that results in the best economic profit. A recommended safety stock quantity, which corresponds to the EPQ, can also be evaluated.

Additional aspects of these embodiments are set forth in the detailed description which follows or may be learned by practice of methods, systems, and articles of manufacture consistent with this embodiment. The foregoing background and summary are not intended to be comprehensive, but instead serve to help artisans of ordinary skill understand the following implementations consistent with the invention set forth in the appended claims. In addition, the foregoing background and summary are not intended to provide any limitations on the claimed invention.

BRIEF DESCRIPTION OF THE DRAWINGS

The accompanying drawings, which are incorporated in and constitute a part of this disclosure, illustrate various embodiments and aspects of the present invention and, together with the description, explain the principles of the invention. In the drawings.

DETAILED DESCRIPTION OF THE INVENTION

Figure 1:
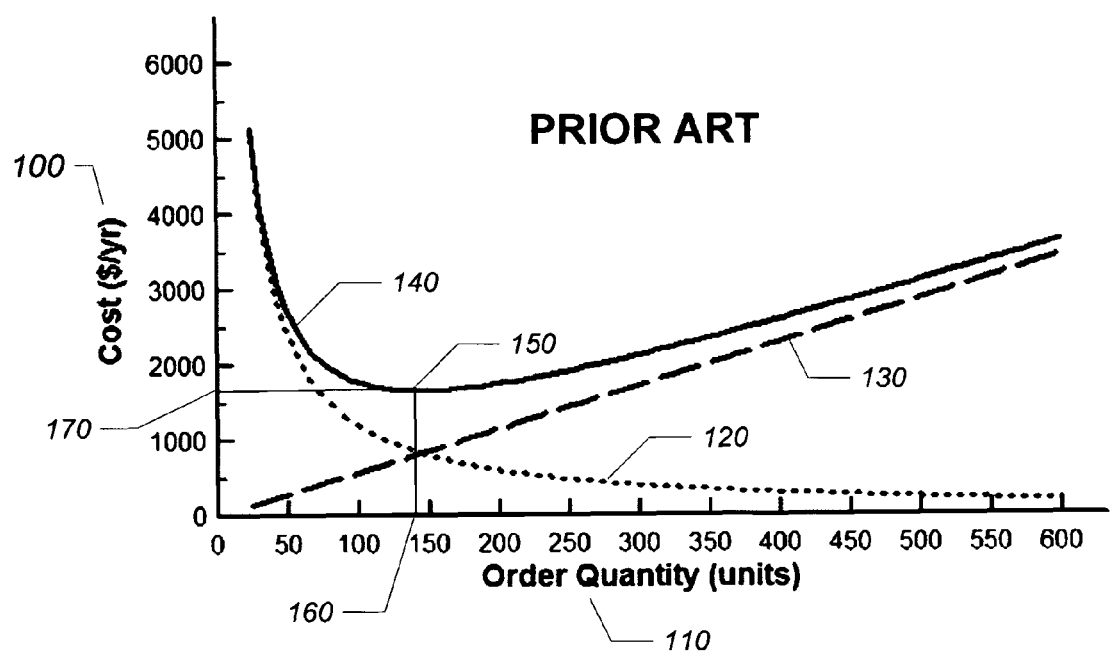
FIG. 1 is an exemplary plot of ordering cost and inventory carrying cost, illustrating the calculation of economic order quantity when safety stock is not included.

Reference will now be made in detail to exemplary embodiments of the invention, examples of which are illustrated in the accompanying drawings. The implementations set forth in the following description do not represent all implementations consistent with the claimed invention; instead, they are merely some examples of systems and methods consistent with the invention.

Key to the invention is an Economic Profit Quantity (EPQ) Model, which balances the net operating income with the capital charge. The quantity that maximizes economic profit is the Economic Profit Quantity $Q_p$. For purposes of this document, the term economic profit will be defined by the following equation:

$$P=N-C \qquad (15)$$

where the variables are defined as follows:
- P: the economic profit (in \$/yr). P is the amount earned above the cost of capital utilized, or, equivalently, the net operating income minus the capital charge.
- N: the net operating income (in \$/yr). N is the money a business receives from sales minus expenses to run the business, including income taxes. While other formulations are available within the scope of the invention, N is preferably defined to be net operating income after taxes (see Stewart, p. 86.)
- C: the capital charge (in \$/yr). C is a measure of how effectively a business uses its capital and reflects the minimum return investors or lenders could receive by allocating funds in another investment.

The net operating income is given by $$N=T^*(G-F-M). \qquad (16)$$

where $T^*=1-T$, and T is the corporate income tax rate, which was 0.35 on average in the United States in 2002.

In equation (16), the gross sales revenue G includes revenues due to price changes, volume (i.e., whether more or less units are being sold), and translation (currency increases or decreases on the global market).

The factory cost F, also known as cost of goods sold, is given by $$F=\hat{C}_o+\hat{C}_m+\hat{C}_s+\hat{X} \qquad (17)$$

where $\hat{C}_o$ was defined in equation (2), $\hat{C}_m=C_m D$ is the total material cost, $\hat{X}$ is the total cost of stockouts. The storage cost $\hat{C}_s$ is given by $$\hat{C}_s=r_s I$$

where $r_s$ is the inventory storage cost ratio (in yr$^{-1}$), representing the cost of storing one dollar of inventory for one year, and is expressed as a percentage per year. $r_s$ is based upon factors such as obsolescence, shrinkage, and insurance. Unlike the variable $r_h$ that was introduced in the EOQ calculation, $r_s$ does not include the cost of capital. A typical value of $r_s$ is 0.125. The capital value of inventory I is given by $$I=(Q/2+fD)(C_m+C_o/Q)$$

where $$f=Z/D \qquad (18)$$

is the safety stock factor (in yr$^{-1}$). Note that if equation (7) is used to calculate Z, then because of equation (11), f depends upon Q. The significance of this fact will be seen below.

In equation (16), M includes miscellaneous costs, such as laboratory operations, engineering, total sales, administration, freight, and other costs such as product liability. The laboratory operations cost includes the cost of labor for research and development, spending, and cost of corporate shared services. The total sales cost includes the costs of order processing, labor for sales, marketing, market research, and merchandising. The cost of administration includes costs of corporate shared services and legal.

In equation (15), the capital charge C is given by $$C=WK \qquad (19)$$

(Stewart, p. 86) where W is the weighted average cost of capital (Stewart, pp. 431-473). W represents the cost of maintaining a dollar of capital invested for a certain period, normally one year. This cost, normally expressed as a percentage, is based upon factors such as the average expected return on alternative investments and current bank interest rate for borrowing. In (19), the operating capital is $$K=r+I-p+a+e. \qquad (20)$$

In (20), r is receivables; p is payables, liabilities and adjustments; a is fixed assets; and e is other long term assets.

Combining equations (16), (19), and (20) into (15) yields:

$$P=T^*(G-F-M)-W(r+I-p+a+e). \qquad (21)$$

For purposes of computing $Q_p$, equation (21) can be simplified to $$P=-(FT^*+WI)+\alpha \qquad (22)$$

where α does not depend upon Q, and where stockout costs $\hat{X}$ have been ignored.

Using equations already provided, the term FT* in (22) can be expanded as follows:

$$FT^*=T^*(Qr_s C_m/2+fr_s DC_m+Fr_s DC_o/Q)+\beta \qquad (23)$$

where β is a quantity that does not depend upon Q.

Similarly, the term WI in (22) can be expanded as follows:

$$WI=QWC_m/2+fWDC_m+fWDC_o/Q. \qquad (24)$$

Substituting equations (23) and (24) into equation (22), yields:

$$P = -T^*(Qr_s C_m/2 + fr_s DC_m + Fr_s DC_o/Q) - \qquad (25)$$
$$(QWC_m/2 + fWDC_m + fWDC_o/Q) + \gamma,$$

where γ is a quantity that does not depend upon Q.

Taking the derivative of equation (25) with respect to the order quantity Q and setting the derivative to zero at the point of maximum economic profit yields the economic profit quantity $Q_p$.

In the special case in which f is independent of Q, the solution can be evaluated in closed form as $$Q_p = \left(\frac{2C_o Df(r_s T^* + W) + T^*}{C_m(r_s T^* + W)}\right)^{1/2} \qquad (26)$$

In the more general case in which f depends upon Q, the EPQ can be found by finding the value of Q that maximizes P in (21), (22), (22), or some equivalent equation. Alternatively, the EPQ can be found by solving numerically for the value of Q such that the derivative of P with respect to Q in (22) is equal to zero. Standard numerical techniques for maximization or finding zeros, such as those set forth by Press et al., can be used to perform such solutions.

We now include stockout costs $\hat{X}$ in equation (17), where previously we had ignored them. The number of stockouts per year is equal to $(1-\lambda)D/Q$. If $X_c$ is the cost of one stockout, then the cost of all stockouts is $$\hat{X}_c = X_c(1-\lambda)D/Q. \tag{27}$$

There is also a fractional charge for each unit short. The number of shortages per order cycle is $\sigma\delta(k)$. The number of order cycles per year is D/Q. The cost per unit short is $r_x C_m$, where $r_x$ is a unit stockout cost ratio. Thus, the total stockout cost due to units short is $$\hat{X}_u = r_x C_m \sigma\delta(k)D/Q \tag{28}.$$

The total stockout cost is $$\hat{X} = \hat{X}_c + \hat{X}_u \tag{29}.$$

More explicit formulations of gross revenues G and miscellaneous costs M can also be specified. We have $$G = gD \tag{30}$$

where g is unit sales revenue (in $/unit). Then $$M = r_m gD \tag{31}$$

where $r_m$ is a (dimensionless) miscellaneous costs ratio.

If (27), (28), (29), (30), and (31) are combined into (21), the result is $$P = T^*(gD - r_m gD - C_o D/Q - C_m D - \tag{32}$$
$$Qr_s C_m/2 - r_s C_o/2 - fr_s DC_m - Fr_s DC_o/Q) -$$
$$X_c(1-\lambda)D/Q - X_u C_m D\sigma\delta(k)/Q) - W(r - p + a + e) -$$
$$(QWC_m/2 + WC_o/2 + fWDC_m + fWDC_o/Q) + \gamma.$$

Alternative ways of calculating the safety stock quantity are possible, all within the scope of the invention. For example, a fixed time $\tau_s$ (in yr) is chosen. The safety stock quantity is then calculated as $Z = \tau_s D$.

Figure 2:
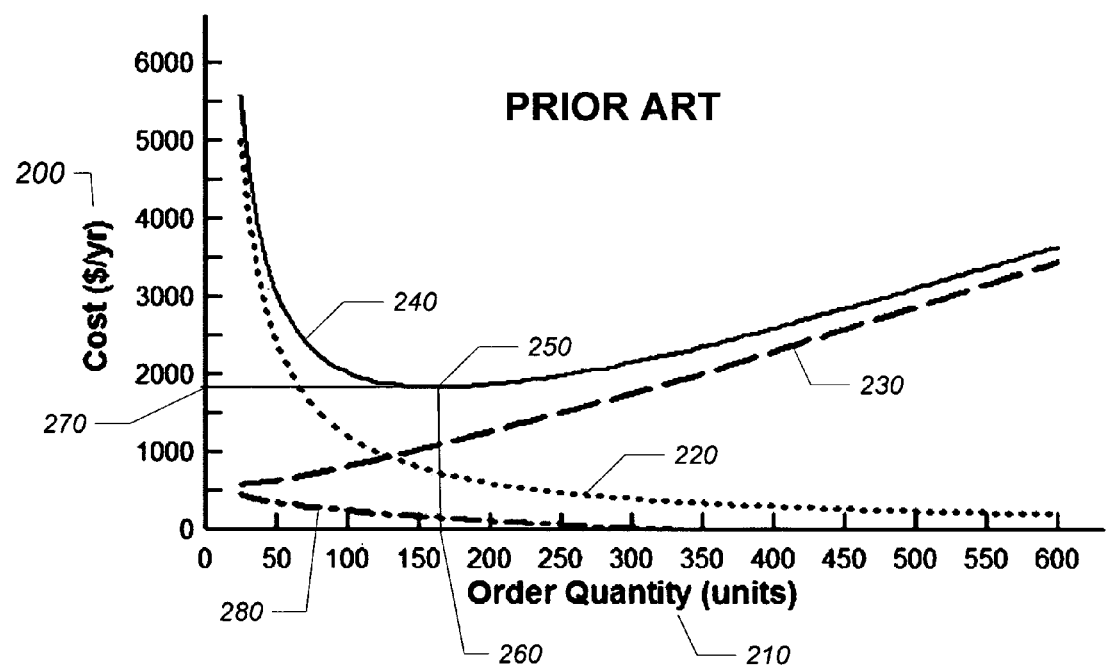
FIG. 2 is an exemplary plot of ordering cost and inventory carrying cost, illustrating the calculation of economic order quantity when safety stock is included.
Figure 3:
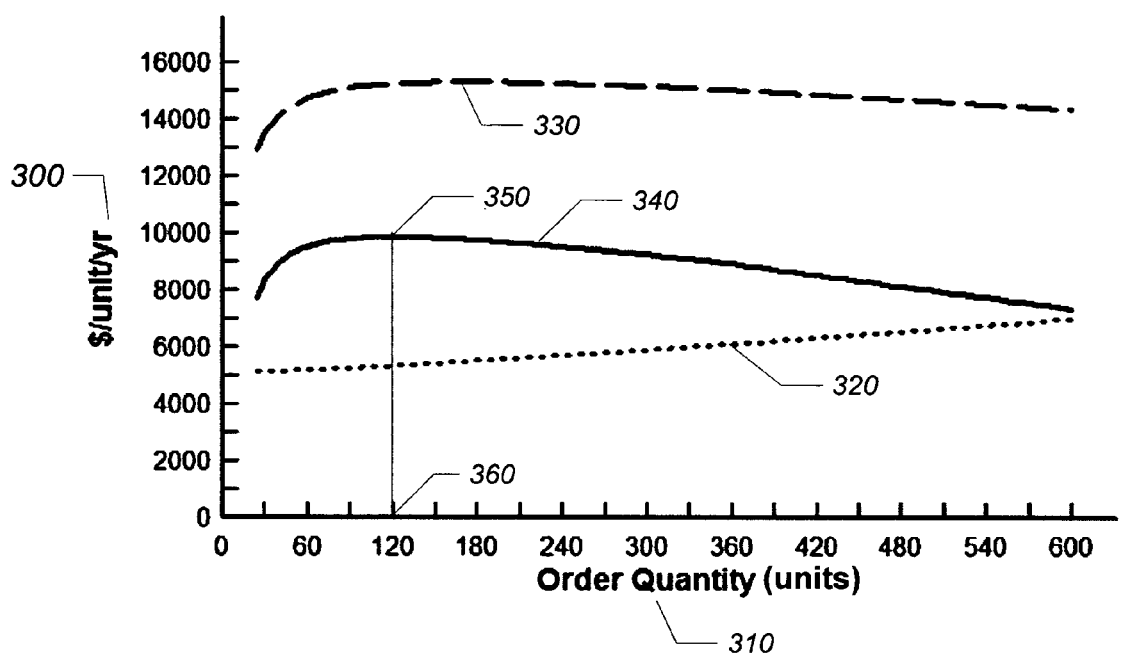
FIG. 3 is an exemplary plot of net income, capital charge, and economic profit, illustrating the calculation of the economic profit quantity according to definitions and equations of the present invention.

FIG. 3 illustrates the results of an EPQ calculation in an exemplary case. All the parameter values used in the EOQ calculations of FIG. 2, described previously, were also used in this EPQ calculation. In addition, the following values were used: T=0.38, W=0.15 yr$^{-1}$, r=0.20 yr$^{-1}$, f=0.02, r=$7,105, I=$4,831, p=$4,420, a=$14,062, e=$14,993, g=100/unit, and $r_m$=0.28.

In FIG. 3, values of the terms from equation (15) correspond to the vertical axis 300. Values of order quantity Q are shown on the horizontal axis 310. The curve 330 for net operating income N is seen to rise for small values of Q, then gradually decrease for larger values. The curve 320 for capital charge C increases linearly as Q increases. The difference between these curves is the curve 340 for economic profit P, which has a maximum 350 at a value of the order quantity Q equal to the economic profit quantity $Q_p$.

The order quantity chosen using the EPQ model may be substantially different from the EOQ model because the information being taken into account is itself significantly different. The equation for EPQ above truly balances the net income with the capital charge at the optimum location for inventory management. The EPQ model tends to result in a smaller run size than the EOQ model. In the example illustrated by FIG. 3, $Q_p$=120 units, which is substantially smaller (by 24 units) than the value recommended by the EOQ model of FIG. 1 without safety stock. Moreover, the EPQ calculation does take safety stock into account, and is 42 units (26%) lower than the EOQ calculation shown in FIG. 2 that does likewise, a significant difference. Economic profit from ordering at the EPQ is $9,893 in this particular example, compared to $9,832, the economic profit from ordering at the EOQ taking safety stock into consideration. This difference is only 0.6%, but it is obtained essentially for free by using the improved approach of the present invention, and for some retailers, especially on items such as computers for which profit margins are low, it can represent an important improvement.

The scope of the invention encompasses calculation of the EPQ by any set of equations. It is easy to find methods and systems that are equivalent to finding the value of Q that maximizes P in equation (15), such as by maximizing some expression that is related to P. For example, it would be equivalent to find a value of Q to maximize 3P−2, or to minimize −P. In these cases, one would be finding a value of Q that corresponds to an extreme value (maximum or minimum) of an expression that is mathematically related to P. It is well known to practitioners of the mathematical and financial arts that much more convoluted but related expressions can be derived, such that an extreme value (maximum or minimum) of the particular expression corresponds to the EPQ. A particular example of this is the metric called rate of return on capital (Stewart, page 136). The value of Q that maximizes rate of return on capital, which is functionally related to economic profit, is the economic profit quantity. Thus, there are infinitely many equivalent techniques whereby exactly the same EPQ can be calculated, all of which are contemplated by, and included within, the invention.

It is important to note that EPQ-based automated decision-making can be used at any stage in the supply chain. For example, a manufacturer might use EPQ to determine the quantity of a type of manufactured item to produce in order to satisfy customer demand, and to automatically order components and raw materials. A retailer, purchasing the item from the manufacturer, might have one or more computer systems executing logic to order a quantity equal to or based on the EPQ, as well as recommended safety stock quantity.

Figure 4:
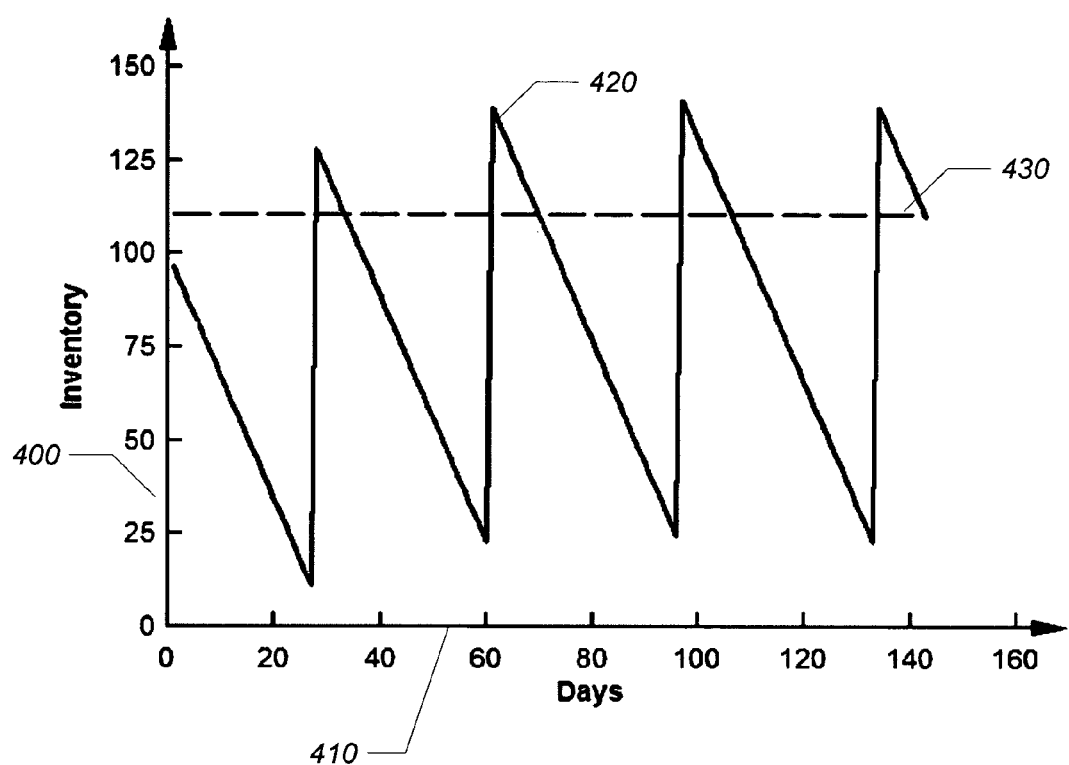
FIG. 4 is an exemplary plot of inventory and time, in accordance with methods and systems consistent with the present invention.

FIG. 4 illustrates how inventory level might change over time in the example illustrated in FIG. 3. The parameters used to produce FIG. 4 are the same as those used to produce FIG. 3. The vertical axis 400 is inventory level in units. The horizontal axis 410 is time in days after some arbitrary starting point. Recall that the lead time $\bar{\tau}$ is 28 days. The reorder point is defined as the daily demand in units times the lead time in days. Reordering of the economic profit quantity occurs when the inventory drops to the reorder point, shown by the dashed line 430. The inventory level is shown by the solid curve 420.

Figure 5:
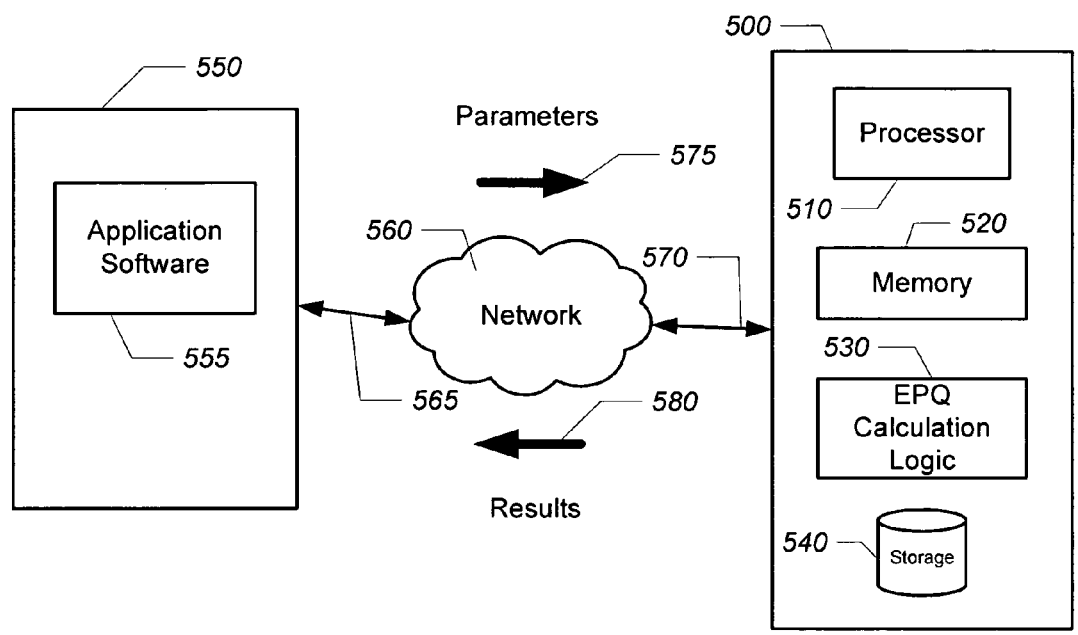
FIG. 5 illustrates an exemplary system environment, in accordance with the methods and systems consistent with the present invention.

FIG. 5 shows an exemplary digital processing system, or server system 500, for calculating the economic profit quantity $Q_p$, as well as related quantities including the safety stock quantity Z and the economic profit P. The server system 500 includes a processor 510 adapted to executing instructions; memory 520 adapted to containing instructions being executed and variables to be used in those instructions; economic profit quantity calculation logic 530, implemented in software or digital hardware, the software adapted to being executed with instructions to the processor 510; and digital storage 540 for saving and providing software and parameters for the calculation. The server system 500 has communication access to a digital network 560, as illustrated by a double-ended arrow 570.

FIG. 5 also shows a host system 550 that runs application software 555 utilizing the calculation of an EPQ by the server system 500. In the illustrated embodiment, the host system 550 also has communication access to the digital network 560, as illustrated by another double-ended arrow 565. The network 560 access allows the two systems to communicate with each other. Typically, along with the request to perform the EPQ calculation the application software 555 communicates parameters to the server system 500, as indicated by the arrow 575. After performing the calculation, the server system 500 transmits the results, including the economic order quantity $Q_p$ and possibly the safety stock quantity Z or the economic profit P through the network 560 to the application software 555, as indicated by the arrow 580.

The network 560 could be wired or wireless; it might be a LAN, a WAN, or a PAN. Some embodiments of the invention do not involve a network at all—the host system 550 and the server system 500, for example, might be the same system. Indeed, the EPQ calculation logic 530 and the application software 555 might even be the same computer program.

Embodiments of the invention include the host system 550 and server system 500 in combination; the host system 550 alone; and the server system 500 alone.

Figure 6:
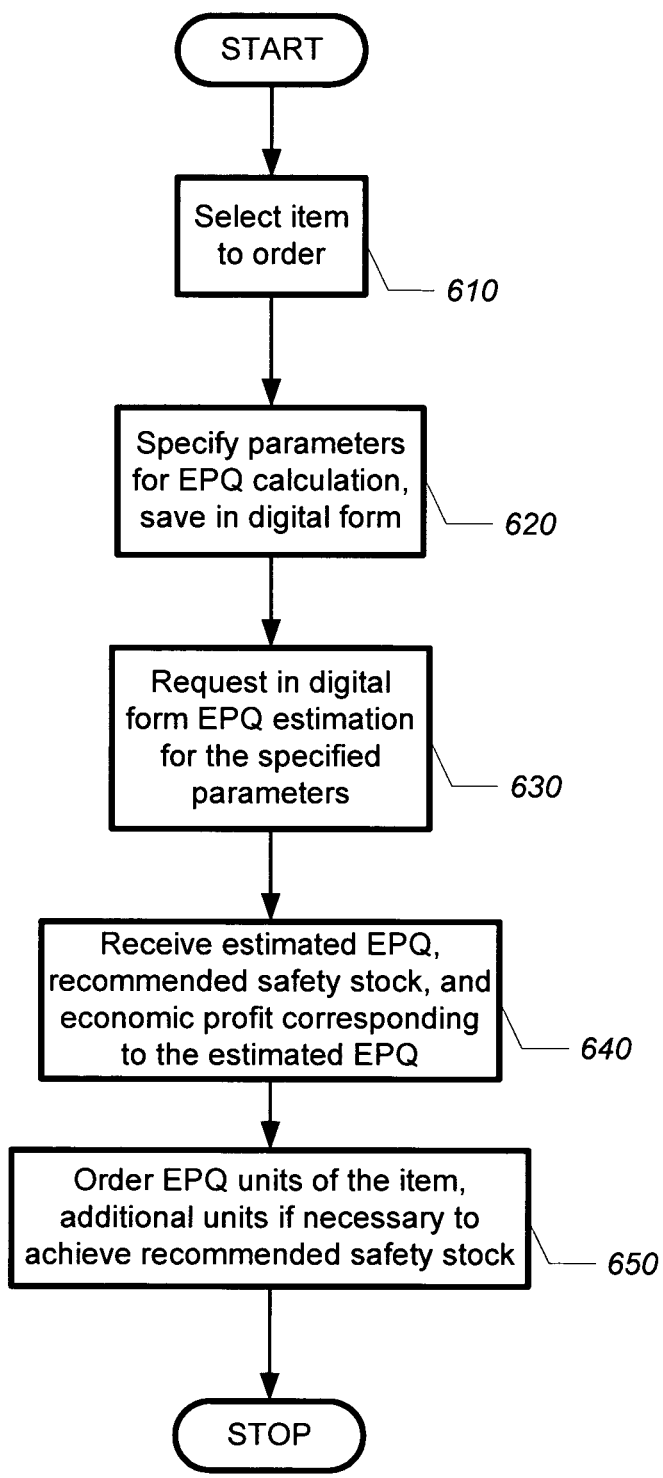
FIG. 6 is an exemplary flowchart illustrating a method for requesting and receiving an economic profit quantity, then using the response when placing an order for inventory.

FIG. 6 illustrates a method for requesting the EPQ by the application software 555. First, an item type (e.g., a SKU) to order is selected 600. This might be done, for example, automatically by a software program, or by a user through a graphical user interface (GUI) to a software program. Parameters, such as those described in connection with the example illustrated by FIG. 3, are specified 620 for performing the calculations. These parameters could come from any source. For example, they might be entered by a user into a computer or into a handheld digital electronic device; they might be retrieved from digital storage; or they could be hard-coded into software. The parameters are saved in digital form in or on any medium or device capable of saving digital information. This might be a hard disk, volatile or nonvolatile memory, compact disk, digital video disk, or magnetic tape, or other medium or device having similar functionality.

Calculation of the EPQ is requested 630 for the specified parameters. The estimated EPQ is received 640, typically through the same communications means (e.g., a network 560, a register, or a bus) through which the request was sent. In the figure, the safety stock quantity and economic profit are also received, but in some embodiments either or both of these quantities are not received. In some embodiments, EPQ units of the item type are ordered 650 from a supplier; in such embodiments, the ordering may be done automatically, such as by application software 555 requesting the EPQ estimation. Additional units may be ordered to satisfy the recommended safety stock quantity. The invention encompasses any order based upon an EPQ estimated by the techniques described herein. So, for example, an order amount differing from the EPQ, or from the sum of the EPQ and the recommended safety stock quantity by some percentage (e.g., 20%) of EPQ, is considered within the scope of the invention if the calculation of the order amount includes estimation of an EPQ as defined herein. Similarly, any order of safety stock whose quantity is based on the EPQ recommendation is within the scope of the present invention.

Figure 7:
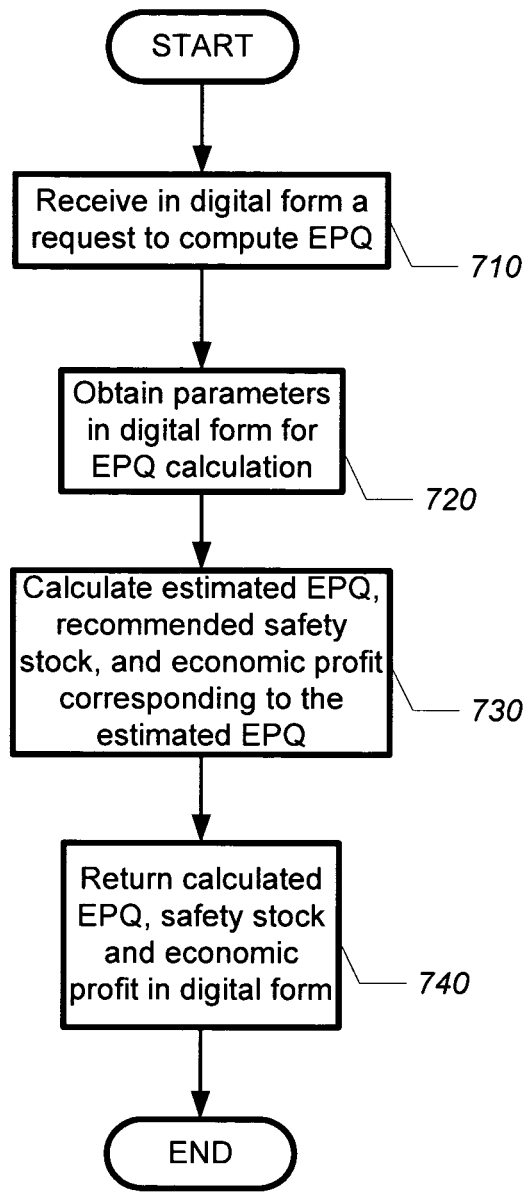
FIG. 7 is an exemplary flowchart illustrating a method for receiving and responding to a request for an economic profit quantity.

As described above, FIG. 6 illustrates an embodiment of the invention from the perspective of application software requesting and using an estimated EPQ. FIG. 7 gives the complementary perspective, a method for satisfying such a request. In other words, the host system 550 in FIG. 5 might use the method of FIG. 6, while the server system 500 of FIG. 5 might use the method of FIG. 7. A request is received 710 in digital form to estimate EPQ. The request could come from any source. For example, the request might be received 710 across a network (of any type), it might come from a local apparatus connected by wire or wirelessly to the processing system performing the calculation, or it could originate from software within the device performing the estimation itself. At least one parameter in digital form is obtained 720 for estimation of the EPQ. Parameters might be received from any source or combination of sources. For example, a parameter could come from a user through a GUI, from the apparatus making the request, from digital storage, or be a default value hard-coded into the software. An estimated EPQ and a corresponding recommended safety stock quantity are calculated 730 using the equations already discussed for this purpose. This calculation will be performed using a digital processing device. In some embodiments such as the one shown in the figure, the economic profit corresponding to the estimated EPQ is also calculated; in others, economic profit is not calculated since EPQ can be calculated directly without calculation of economic profit. The estimated EPQ is returned 740 to the entity making the request, typically through the same communications means as was used to make the request. The flowchart shows a recommended safety stock quantity being returned 740 as well, but some embodiments of the invention do not include this action; similarly, for returning 740 an estimated economic profit corresponding to the estimated EPQ. Within the scope of the invention, the methods of FIG. 6 and FIG. 7 can be combined into a single method.

Equation (25) implies that the economic profit P depends on order quantity Q and safety stock factor f, the other parameters being constants. According to equation (18), f depends on the safety stock quantity Z. In some embodiments of the invention, the safety stock quantity is a function of Q. An example of such a formulation for safety stock quantity is given in equations (7)-(11). Economic profit can be regarded, therefore, as depending entirely upon Q. In other words, given a value of Q, one can calculate Z, then f, and ultimately P. Consequently, numerical techniques, well known in the art, for maximizing a function of a single variable (i.e., Q) can be used to calculate the EPQ, as well as the corresponding economic profit and recommended safety stock. As a practical matter, a digital processing system, such as a computer, is required to perform this calculation.

Techniques for maximization are found, for example, in Chapter 10 of Press et al., and the "Golden Section Search in One Dimension" method, in particular, is adequate. That algorithm requires the user to bracket the maximum value, which is straightforward for the function P, which first rises and then falls, with a single maximum value. (Equivalently, one might compute a minimum of −P.)

This particular choice of safety stock formulation is not exclusive or limiting in use in the invention, and any other formula for recommending or estimating safety stock quantity can be used within the scope of the present invention. For example, a safety stock formulation might utilize a forecast distribution of demand based upon statistical techniques. Similarly, any technique for solving for the maximum economic profit is also within the scope of the invention.

Figure 8:
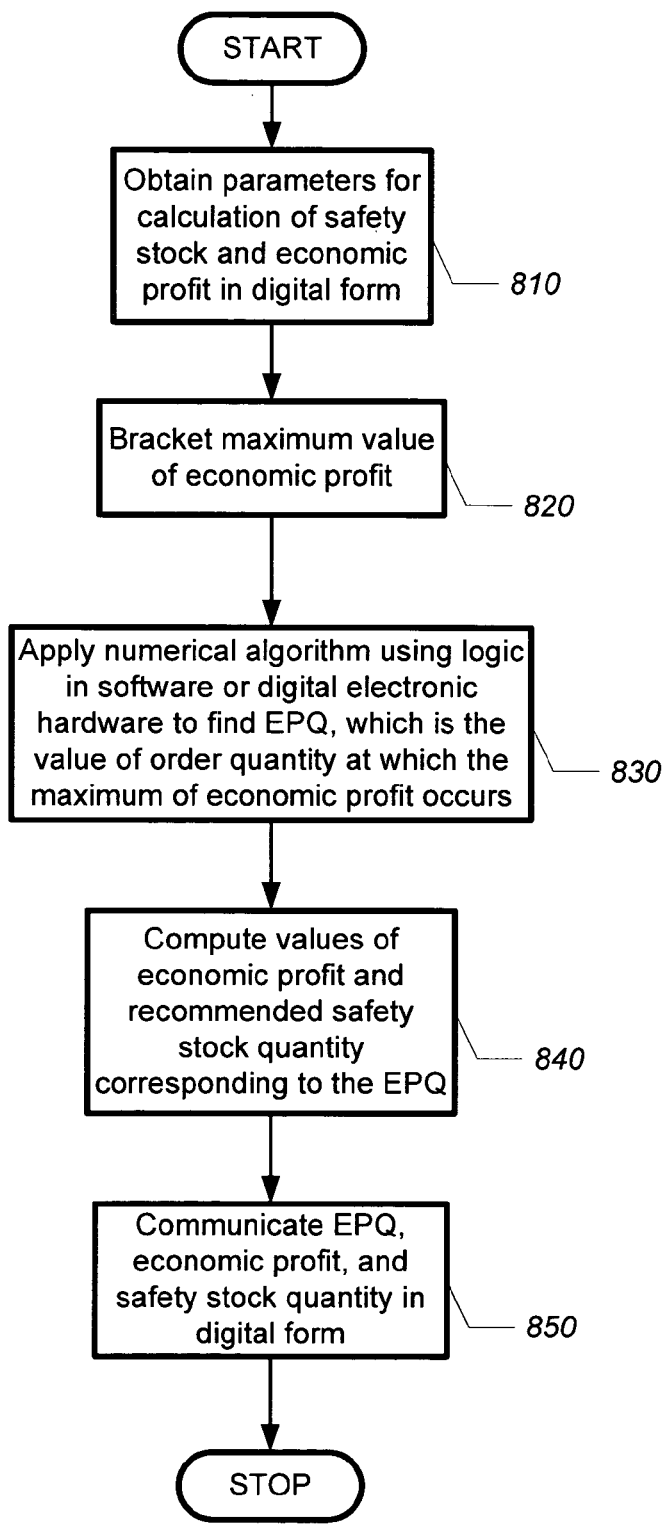
FIG. 8 is an exemplary flowchart illustrating application of an iterative numerical method to calculate an estimated economic profit quantity, and corresponding economic profit and recommended safety stock quantity.

FIG. 8 is a particular implementation of the above-described technique. Parameters are obtained 810 for calculation of safety stock and economic profit. These are the values of the variables used in equations already described. They are obtained in digital form, which might be by communication across a network or bus, extraction from digital storage, or any other means; the parameters might be hard-coded in a software application. Values are chosen to bracket 820 the maximum economic profit, as explained in Press et al. For example, one might choose values a and b to bracket the value of Q where the maximum economic profit occurs as a=0.1 and b=10,000,000, which would handle most situations. The value of b could obviously be increased further for a situation where the order quantity might conceivably be more than 10,000,000. These values could be chosen by logic embodied in software, extracted from data storage, or input by a user through a graphical user interface or browser. A numerical method is applied to solve 830 for the EPQ, such as the Golden Section Search algorithm. Typically this will be carried out by logic implemented in software or digital electronic hardware. Equation (25) might be used for this calculation, simply setting $\gamma$ to zero (because the maximum of a function plus a constant and the maximum of the function occur at the same point). Once the EPQ is found, then corresponding values of economic profit and recommended safety stock are computed 840. In many embodiments, calculation of safety stock quantity will already have been done in each iterative step of the numerical solution, so the value of this quantity in the last step will be the recommended value, and separate calculation will not be required. It is possible that economic profit will be fully computed at each step in the iteration, but unlikely because, as already described, equation (25) can be used in the maximization with $\gamma=0$. Calculation of economic profit itself requires that $\gamma$ be explicitly calculated at least once, assuming that equation (25) was used in the maximization. Of course, many other equivalent formulas exist for calculation of P, as is illustrated by the variety of equations already presented herein.

The above method results in a value for the EPQ itself, as well as the corresponding economic profit, and the corresponding recommended safety stock. Any or all of these quantities can be communicated digitally, depending upon the needs of the requester (e.g., person, computer software application), either expressed in a request, or implied.

Figure 9:
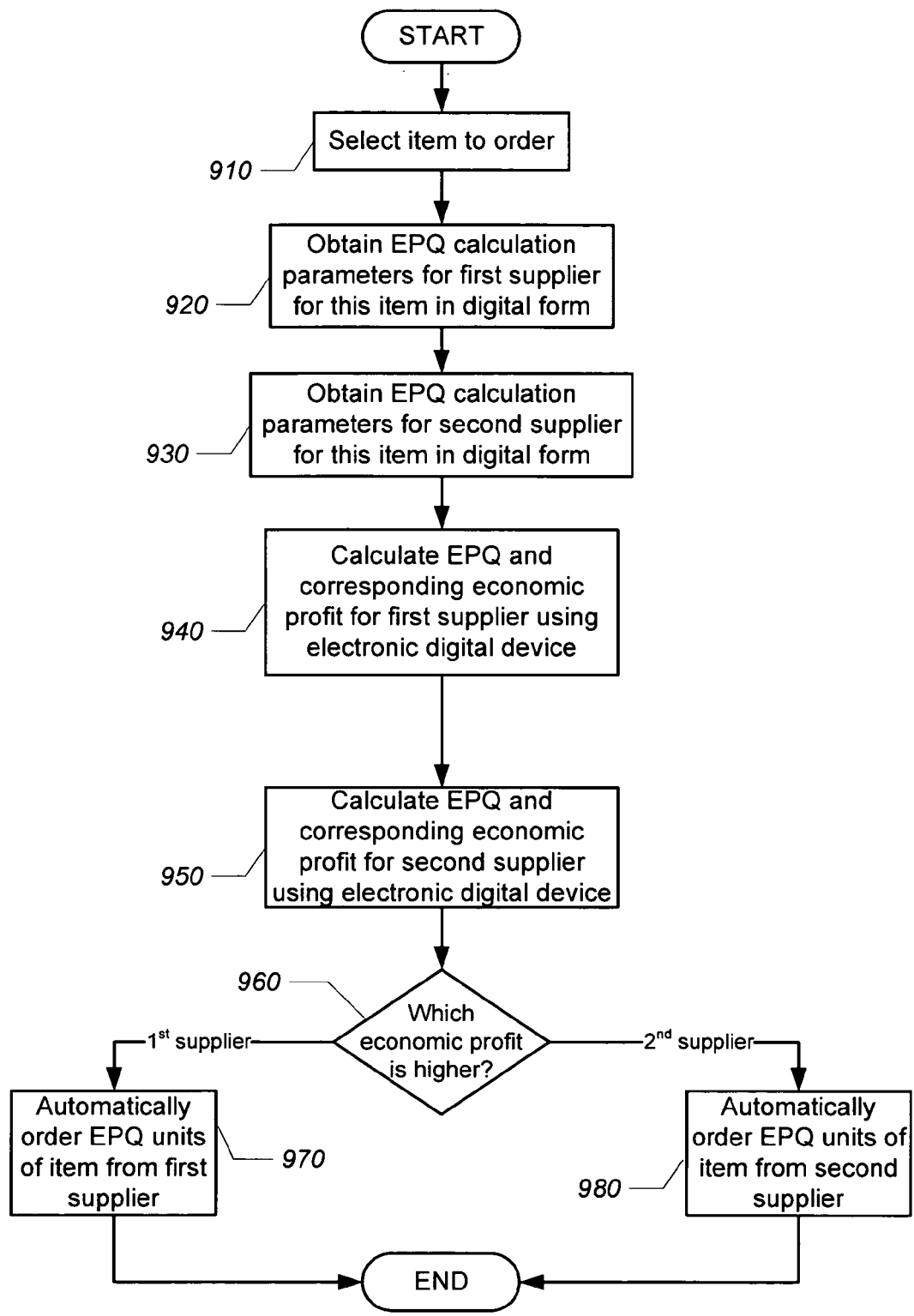
FIG. 9 is an exemplary flowchart illustrating an automated method for choosing between suppliers.

The results of the EPQ calculation can be used for many different practical purposes. FIG. 9 illustrates employing the EPQ to select between two suppliers. An item type (e.g., SKU) is selected 910 to be ordered. Parameters are obtained for the EPQ calculation for the first and second supplier in steps 920 and 930 in digital form. Each supplier might impose different restrictions on fulfillment, such as lead time. An EPQ and corresponding economic profit are calculated (steps 940 and 950) for each supplier. Performance of these calculations utilizes a digital electronic device. The economic profits from each of the two suppliers are compared 960 by logic embodied in software or digital electronic hardware. In steps 970 and 980, the item is ordered from that supplier whose parameters, or deal, corresponds to the higher economic profit.

Figure 10:
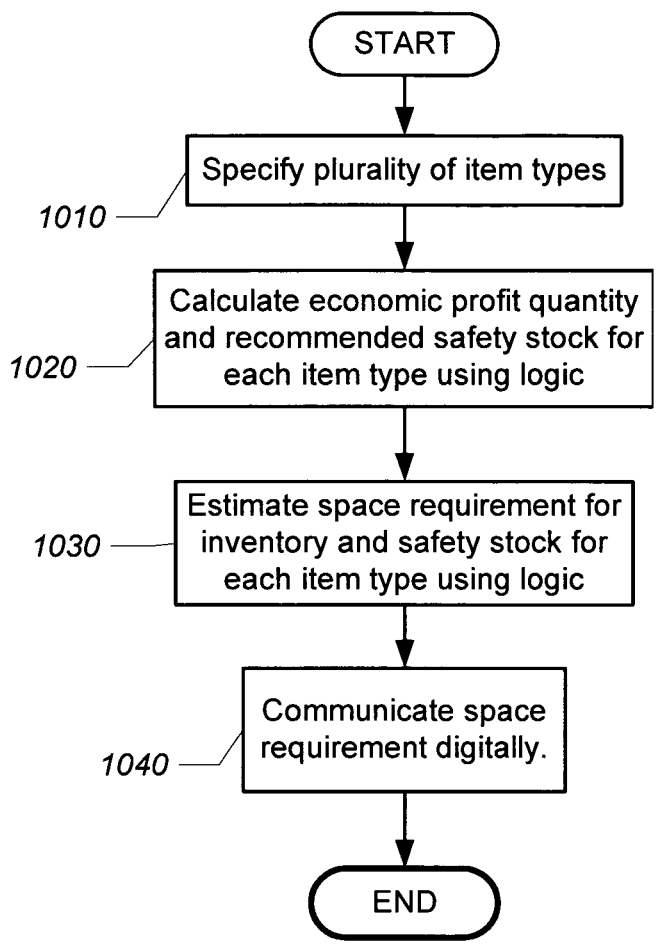
FIG. 10 is an exemplary flowchart illustrating an automated method for determining space requirements based upon an estimated EPQ and associated recommended safety stock quantity.

FIG. 10 illustrates another application of estimation of EPQ and the corresponding safety stock quantity. A plurality of item types (e.g., SKUs) are specified 1010 in digital form. Using logic implemented in software or digital hardware, EPQ and safety stock quantity are estimated for each item type 1020 using the definition and methods described herein. Also using such logic, space requirements in some facility (e.g., a warehouse or a retail outlet) are calculated 1030 based on the EPQ and safety stock quantity for each item type. The space requirements will depend upon a variety of factors, such as the size of an item of each type and how high the items can be stacked. The estimated space requirement is then communicated 1040 digitally.

The foregoing description of implementations consistent with the present invention does not represent a comprehensive list of all such implementations or all variations of the implementations described. The description of only some implementations should not be construed as an intent to exclude other implementations. One of ordinary skill in the art will understand how to implement the invention in the appended claims in may other ways, using equivalents and alternatives that do not depart from the scope of the following claims. The systems and methods disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques. Which quantities are communicated depends upon need or purpose. For example, all three quantities might be routinely communicated. On the other hand, only those quantities specified in an initial request to perform the calculation might be communication. The communication means might be any form or medium of digital communication.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

What is claimed is:

1. A method, comprising:
   a. receiving by a digital processing system a request in digital form for estimation of an economic profit quantity and a reorder time, wherein economic profit quantity is a quantity of inventory to be ordered or produced, which corresponds to a maximum in estimated economic profit, economic profit being defined as the excess of net operating income over capital charge;
   b. obtaining, in digital form, a plurality of parameters needed for the estimation of the economic profit quantity;
   c. computing using logic executing within the digital processing system an estimation of the economic profit quantity, the logic
      i) utilizing a parameter from the plurality of parameters,
      ii) calculating net operating income using a functional relationship with income tax rate,
      iii) calculating capital charge using a functional relationship with expected capital value of inventory, and
      iv) calculating expected capital value of inventory using a functional relationship with safety stock quantity; and d. estimating the reorder time at which the economic profit quantity should be ordered or produced, the time determined by the inventory dropping below a reorder point that depends upon an estimated demand and a lead time; and e. returning, in digital form, the estimation of the economic profit quantity.

2. The method of claim 1, wherein computing the economic profit quantity involves finding a quantity that maximizes an expression for economic profit.

3. The method of claim 1, wherein computing the economic profit quantity involves finding a quantity that corresponds to an extreme value of an expression distinct from, but functionally related to, economic profit.

4. The method of claim 1, further comprising:
e. estimating, by logic executing within the digital processing system, a recommendation for a safety stock quantity; and
f. returning, in digital form, wherein the safety stock quantity being recommended is based upon a calculation in which safety stock quantity depends functionally upon economic profit quantity.

5. The method of claim 1, further comprising:
e. calculating, by logic executing within the digital processing system, an estimation of economic profit corresponding to the estimation of the economic profit quantity; and
f. returning, in digital form, the estimation of economic profit.

6. The method of claim 1, wherein, in the step of obtaining, a parameter is obtained from digital storage.

7. The method of claim 1, wherein the request is received through a digital network.

8. A method, comprising:
a. communicating by a digital processing system a first request in digital form for estimation of a first economic profit quantity and a reorder time, wherein economic profit quantity is a quantity of inventory to be ordered or produced, which corresponds to a maximum in estimated economic profit, estimated economic profit being defined as the excess of net operating income over capital charge; and
b. receiving, by the digital processing system, in digital form in response to the first request, an estimation of the first economic profit quantity, wherein
  i) net operating income has been calculated using a functional relationship with income tax rate,
  ii) capital charge has been calculated using a functional relationship with expected capital value of inventory, and
  iii) expected capital value of inventory has been calculated using a functional relationship with safety stock quantity, and
c. estimating the reorder time at which the economic profit quantity should be ordered or produced, the time determined by the inventory dropping below a reorder point that depends upon an estimated demand and a lead time.

9. The method of claim 8, wherein the first request is transmitted across a digital network.

10. The method of claim 8, further comprising:
c. executing logic on a digital processing system that automatically causes a quantity of goods or material Q to be ordered or produced, such that Q differs from the first estimation of economic profit quantity by not more than ±20 percent of the estimation of first economic profit quantity.

11. The method of claim 8, further comprising:
c. receiving, in digital form, a recommendation for a safety stock quantity, corresponding to the estimation of the first economic order quantity, wherein the safety stock quantity being recommended is based upon a calculation in which safety stock quantity depends functionally upon economic profit quantity.

12. The method of claim 11, further comprising:
d. executing logic, on an digital processing system, that automatically causes a quantity of goods or material Q to be ordered or produced such that Q differs from the recommendation of safety stock quantity by not more than ±20 percent of the recommendation of safety stock quantity.

13. The method of claim 8, further comprising:
c. receiving, in digital form, an estimation of economic profit that corresponds to the estimation of the first economic profit quantity.

14. The method of claim 8, further comprising:
c. causing a parameter necessary for estimation of the first economic profit quantity to be obtained from electronic digital storage; and
d. communicating the parameter in digital form.

15. The method of claim 8, wherein the first economic profit quantity is associated with ordering a quantity of goods or material of an item type from a first supplier, the method further comprising:
c. communicating a first request in digital form for estimation of a second economic profit quantity, wherein the second economic profit quantity is associated with ordering the same quantity of goods or material of the item type from a second supplier; and
d. executing digital logic that automatically selects a preferred supplier to be the first supplier if the estimation of the first economic profit quantity exceeds the estimation of the second economic profit quantity, and to be the second supplier if the estimation of the second economic profit quantity exceeds the estimation of the first economic profit quantity.

16. The method of claim 15, further comprising:
e. executing logic on an digital processing system that automatically causes a quantity of goods or material Q to be ordered from the preferred supplier, such that if the preferred supplier is the first supplier, then Q differs from the estimation of the first economic profit quantity by not more than ±20 percent of the estimation of the first economic profit quantity, and if the preferred supplier is the second supplier, then Q differs from the estimation of the second economic profit quantity by not more than ±20 percent of the estimation of the second economic profit quantity.

17. An apparatus, comprising:
a. a digital processing system; and
b. logic, implemented in software, accessed from non-transitory, tangible storage, or digital hardware in the digital processing system, that
  i) receives a request in digital form for estimation of an economic profit quantity and a reorder time, wherein economic profit quantity is a quantity of inventory to be ordered or produced, which corresponds to a maximum in estimated economic profit, economic profit being defined as the excess of net operating income over capital charge,
  ii) obtains, in digital form, a plurality of parameters needed for the estimation of the economic profit quantity, iii) computes an estimation of the economic profit quantity, the logic including the steps of
    A) utilizing a parameter from the plurality of parameters,
    B) calculating net operating income using a functional relationship with income tax rate,
    C) calculating capital charge using a functional relationship with expected capital value of inventory, and
    D) calculating expected capital value of inventory using a functional relationship with safety stock quantity, and
iv) estimates the reorder time at which the economic profit quantity should be ordered or produced, the time determined by the inventory dropping below a reorder point that depends upon an estimated demand and a lead time, and
v) returns, in digital form, the estimation of the economic profit quantity.

18. The apparatus of claim 17, further comprising:
c. a digital storage system containing a plurality of parameters adapted to being used in estimation of the economic profit quantity;
d. a digital network adapted to communication between the digital processing system and the digital storage system; and
e. logic, implemented in software or digital hardware in the digital processing system, that obtains the plurality of parameters from the digital storage system through the digital network, and uses them in estimation of the economic profit quantity.

19. The method of claim 1, wherein net operating income is defined as (1-T)(G-F-M), and wherein T is corporate income tax rate; G includes revenues due to price changes, volume, and translation; F is cost of goods sold; and M includes costs of administration.

20. The method of claim 1, wherein capital charge is defined as the product of W and K, where W is weighted average cost of capital and K is operating capital.

21. The method of claim 1, further comprising the steps of:
e. calculating a safety stock quantity that is functionally related to the reorder quantity; and
f. replenishing a safety stock when inventory on hand drops below the safety stock quantity.

22. The method of claim 1, wherein the calculation of reorder quantity is performed reorder quantity is performed using an iterative numerical method.

23. An apparatus, comprising:
a. a digital processing system; and
b. logic, implemented in software, accessed from non-transitory tangible storage, or digital hardware in the digital processing system, that
    i) communicates a first request in digital form for estimation of a first economic profit quantity_and a reorder time, wherein economic profit quantity is a quantity of inventory to be ordered or produced, which corresponds to a maximum in estimated economic profit, estimated economic profit being defined as the excess of net operating income over capital charge, and
    ii) receives, in digital form in response to the first request, an estimation of the first economic profit quantity, wherein
        A) net operating income has been calculated using a functional relationship with income tax rate,
        B) capital charge has been calculated using a functional relationship with expected capital value of inventory, and
        C) expected capital value of inventory has been calculated using a functional relationship with safety stock quantity, and
    iii) estimates the reorder time at which the economic profit quantity should be ordered or produced, the time determined by the inventory dropping below a reorder point that depends upon an estimated demand and a lead time.

\* \* \* \* \*